US012732322B2

(12) United States Patent
Sun et al.

(10) Patent No.: US 12,732,322 B2
(45) Date of Patent: Sep. 8, 2026

(54) DEDICATED RESOURCE CONFIGURATION FOR TRANSMISSION OF DEMODULATION REFERENCE SIGNAL

(71) Applicant: Nokia Technologies OY, Espoo (FI)

(72) Inventors: Jingyuan Sun, Beijing (CN); Rapeepat Ratasuk, Inverness, IL (US); David Bhatoolaul, Swindon (GB)

(73) Assignee: Nokia Technologies OY, Espoo (FI)

( * ) Notice: Subject to any disclaimer, the term of this patent is extended or adjusted under 35 U.S.C. 154(b) by 637 days.

(21) Appl. No.: 18/248,726

(22) PCT Filed: Oct. 16, 2020

(86) PCT No.: PCT/CN2020/121709

§ 371 (c)(1),
(2) Date: Apr. 12, 2023

(87) PCT Pub. No.: WO2022/077524

PCT Pub. Date: Apr. 21, 2022

(65) Prior Publication Data

US 2023/0388079 A1 Nov. 30, 2023

(51) Int. Cl.
*H04L 5/00* (2006.01)

(52) U.S. Cl.
CPC .......... *H04L 5/0051* (2013.01); *H04L 5/0094* (2013.01)

(58) Field of Classification Search
None
See application file for complete search history.

(56) References Cited

U.S. PATENT DOCUMENTS

2012/0282936 A1* 11/2012 Gao ...................... H04L 5/0023 455/450
2015/0230211 A1* 8/2015 You ...................... H04L 5/0051 370/330

(Continued)

FOREIGN PATENT DOCUMENTS

CN 108352877 A 7/2018
CN 108365933 A 8/2018

(Continued)

OTHER PUBLICATIONS

Office action received for corresponding Chinese Patent Application No. 202080107920.7, dated Dec. 28, 2024, 7 pages of office action and no page of translation available.

(Continued)

*Primary Examiner* — Diane L Lo
(74) *Attorney, Agent, or Firm* — Barta Jones, PLLC

(57) ABSTRACT

In one embodiment, the method includes receiving, at a first device and from a second device, an indication of a resource range, related to a transmission of a demodulation reference signal associated with a control channel reception, including at least one of at least one entire resource element group, or at least one entire control channel element; and wherein the resource elements located in the resource range are dedicated for the transmission of the demodulation reference signal and unavailable for a transmission of control information from the second device; receiving the demodulation reference signal based on the indication; and decoding a control channel between the first and second devices based on the demodulation reference signal.

11 Claims, 9 Drawing Sheets

(56) References Cited

U.S. PATENT DOCUMENTS

2019/0166614 A1 5/2019 Byun et al.
2020/0412515 A1* 12/2020 Xu .......................... H04W 4/70
2022/0015123 A1* 1/2022 Taherzadeh Boroujeni ................ H04L 5/0051

FOREIGN PATENT DOCUMENTS

| | | | |
|---|---|---|---|
| CN | 109392154 | A | 2/2019 |
| CN | 109474407 | A | 3/2019 |
| EP | 2493092 | A2 | 8/2012 |
| WO | 2017/192224 | A1 | 11/2017 |
| WO | 2018/152153 | A1 | 8/2018 |
| WO | 2019/000180 | A1 | 1/2019 |
| WO | 2019/029523 | A1 | 2/2019 |

OTHER PUBLICATIONS

"E-PDCCH Transmission with DMRS as Demodulation RS", 3GPP TSG RAN WG1 Meeting #67, R1-113958, Agenda: 7.7.1, Research in Motion, Nov. 14-18, 2011, pp. 1-4.

"Study on Support of Reduced Capability NR Devices," 3GPP TSG RAN Meeting #88e, Electronic Meeting, Jun. 29-Jul. 3, 2020, pp. 1-5.

3GPP TS 38.211 V16.3.0, 3rd Generation Partnership Project; Technical Specification Group Radio Access Network; NR; Physical Channels and Modulation (Release 16), pp. 1-133, Sep. 2020.

3GPP TS 38.213 V16.3.0, 3rd Generation Partnership Project; Technical Specification Group Radio Access Network; NR; Physical Layer Procedures for Control (Release 16); Sep. 2020.

International Search Report and Written Opinion received for corresponding Patent Cooperation Treaty Application No. PCT/CN2020/121709, dated Jul. 15, 2021, 9 pages.

"Discussion on NR sidelink Mode 2 resource allocation", 3GPP TSG RAN WG1 #98bis, R1-1910007, Agenda: 7.2.4.2.2, Spreadtrum Communications, Oct. 14-20, 2019, 5 pages.

Extended European Search Report received for corresponding European Patent Application No. 20957302.1, dated Jun. 20, 2024, 13 pages.

"Feature lead summary for NR-U DL Signals and Channels", 3GPP TSG RAN WG1#98bis, R1-1911261, Agenda: 7.2.2.1.2, Motorola Mobility, Aug. 14-20, 2019, 31 pages.

"On Remaining System Information Delivery", 3GPP TSG-RAN WG1 NR AH #18-01, R1-1800804, Agenda: 7.1.2.2, Nokia, Jan. 22-26, 2018, 13 pages.

* cited by examiner

DEDICATED RESOURCE CONFIGURATION FOR TRANSMISSION OF DEMODULATION REFERENCE SIGNAL

CROSS-REFERENCE TO RELATED APPLICATIONS

This application is a national phase under 35 U.S.C. § 371 of PCT International Application No. PCT/CN2020/121709 which has an International filing date of Oct. 16, 2020, the entire contents of each of which are hereby incorporated by reference.

FIELD

Embodiments of the present disclosure generally relate to the field of telecommunication and in particular to devices, methods, apparatuses and computer readable storage media of dedicated resource configuration for transmission of Demodulation Reference Signal (DMRS).

BACKGROUND

In release 17, a new study item has been introduced as "Study on support of reduced capability NR devices". Such new device type has a lower device cost and complexity as compared to high-end Enhanced Mobile Broadband (eMBB) and Ultra-relaible and Low Latency Communication (URLLC) devices of release 15 and 16. This is especially the case for industrial sensors.

New Radio (NR) Physical Downlink Control Channel (PDCCH) channel estimation and demodulation is based on dedicate DMRS, where DMRS Resource Element (RE) and PDCCH RE are multiplexed in the same Physical Resource Block (PRB)/symbol. DMRS is used for User Equipment (UE) to do channel estimation and used for PDCCH receiving.

SUMMARY

In general, example embodiments of the present disclosure provide a solution of dedicated resource configuration for transmission of DMRS.

In a first aspect, there is provided a first device. The first device comprises at least one processor; and at least one memory including computer program codes; the at least one memory and the computer program codes are configured to, with the at least one processor, cause the first device at least to receive, from a second device, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device; receive the demodulation reference signal based on the indication; and decode a control channel between the first and second devices based on the demodulation reference signal.

In a second aspect, there is provided a second device. The second device comprises at least one processor; and at least one memory including computer program codes; the at least one memory and the computer program codes are configured to, with the at least one processor, cause the second device at least to generate an indication of a resource range, related to a transmission of a demodulation reference signal associated with a control channel reception, comprising at least one of the following: at least one entire resource element group, or at least one entire control channel element; and wherein resource elements located in the resource range are dedicated for the transmission of the demodulation reference signal and unavailable for a transmission of control information from the second device; transmit the indication to a first device; transmit the demodulation reference signal to the first device based on the indication; and perform the transmission of the control information via a control channel between the first and second devices.

In a third aspect, there is provided a first device. The first device comprises at least one processor; and at least one memory including computer program codes; the at least one memory and the computer program codes are configured to, with the at least one processor, cause the first device at least to receive, from a second device, an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; receive the demodulation reference signal based on the indication; and decode a control channel between the first and second devices based on the demodulation reference signal.

In a fourth aspect, there is provided a second device. The second device comprises at least one processor; and at least one memory including computer program codes; the at least one memory and the computer program codes are configured to, with the at least one processor, cause the second device at least to generate an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; transmit the indication to a first device; transmit the demodulation reference signal to the first device based on the indication; and perform the transmission of the control information via a control channel between the first and second devices.

In a fifth aspect, there is provided a method. The method comprises receiving, at a first device and from a second device, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device; receiving the demodulation reference signal based on the indication; and decoding a control channel between the first and second devices based on the demodulation reference signal.

In a sixth aspect, there is provided a method. The method comprises generating, at a second device, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device; transmitting the indication to a first device; transmitting the demodulation reference signal to the first device based on the indication; and performing the transmission of the control information via a control channel between the first and second devices.

In a seventh aspect, there is provided a method. The method comprises receiving, at a first device and from a second device, an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; receiving the demodulation reference signal based on the indication; and decoding a control channel between the first and second devices based on the demodulation reference signal.

In an eighth aspect, there is provided a method. The method comprises generating, at a second device, an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; transmitting the indication to a first device; transmitting the demodulation reference signal to the first device based on the indication; and performing the transmission of the control information via a control channel between the first and second devices.

In a ninth aspect, there is provided an apparatus comprising means for receiving, from a second device, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device; means for receiving the demodulation reference signal based on the indication; and means for decoding a control channel between the first and second devices based on the demodulation reference signal.

In a tenth aspect, there is provided an apparatus comprising means for generating, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device; means for transmitting the indication to a first device; means for transmitting the demodulation reference signal to the first device based on the indication; and means for performing the transmission of the control information via a control channel between the first and second devices.

In an eleventh aspect, there is provided an apparatus comprising means for receiving, from a second device, an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; means for receiving the demodulation reference signal based on the indication; and means for decoding a control channel between the first and second devices based on the demodulation reference signal.

In a twelfth aspect, there is provided an apparatus comprising means for generating an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; means for transmitting the indication to a first device; means for transmitting the demodulation reference signal to the first device based on the indication; and means for performing the transmission of the control information via a control channel between the first and second devices.

In a thirteenth aspect, there is provided a computer readable medium having a computer program stored thereon which, when executed by at least one processor of a device, causes the device to carry out the method according to the fifth aspect.

In a fourteenth aspect, there is provided a computer readable medium having a computer program stored thereon which, when executed by at least one processor of a device, causes the device to carry out the method according to the sixth aspect.

In a fifteenth aspect, there is provided a computer readable medium having a computer program stored thereon which, when executed by at least one processor of a device, causes the device to carry out the method according to the seventh aspect.

In a sixteenth aspect, there is provided a computer readable medium having a computer program stored thereon which, when executed by at least one processor of a device, causes the device to carry out the method according to the eighth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
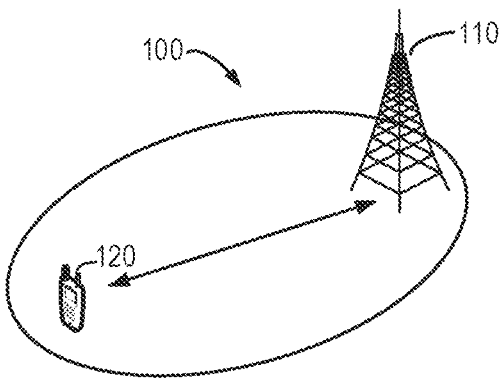
FIG. 1 illustrates an example communication network 100 in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 includes a terminal device 110 (hereinafter may also be referred to as a first device 110 or a UE 110. The communication network 100 may comprise a network device 120 (hereinafter may also be referred to as a second device 120 or a gNB 120). The network device 120 may communicate with the terminal device 110.

It is to be understood that the number of terminal devices and network devices are only for the purpose of illustration without suggesting any limitations. The communication network 100 may include any suitable number of terminal devices adapted for implementing embodiments of the present disclosure.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, NR PDCCH channel estimation and demodulation is based on dedicate DMRS, where DMRS RE and PDCCH RE are multiplexed in the same Physical PRB/symbol. DMRS is used for UE to do channel estimation and used for PDCCH receiving.

The resources for PDCCH may be referred to as Control Resource Set (CORESET), which may comprise one or more symbols in the time domain and multiple PRBs. One CORESET may comprise multiple Control Channel Elements (CCEs). A CCE consists of 6 resource-element groups (REGs) where a REG equals one RB during one OFDM symbol.

Based on current DMRS design for PDCCH, the channel estimation can be performed only based on a small number of DMRS REs. For UE in a bad coverage, the number of available DMRS REs may not be sufficient to provide good channel estimation. Higher density of DMRS are requested to improve channel estimation and improve performance of PDCCH.

Some approaches have been proposed to improve the density of DMRS. For example, DMRS in multiple slots could be assumed as with same channel status and used for channel estimation. The channel estimation determined based on DMRS from multiple can be used for PDCCH in one slot.

Furthermore, it has been defined that there are two type of DMRS utilization. In all these two types of DMRS, 3 out of 12 REs in one REG is used as DMRS. For a narrow band mapping, i.e. only when detecting one PDCCH, only DMRS in the CCE associated to that PDCCH could be used for receiving that PDCCH, while for a wideband mapping, i.e. DMRS in contiguous PRBs (including the PDCCH) could be used for receiving that PDCCH, but still the DMRS only on specific REs in each REG.

The present disclosure provides solutions of dedicated resource configuration for transmission of DMRS. In this solution, a specific resource range related to a transmission of a demodulation reference signal associated with a control channel reception can be configured. The resource range may comprise at least one of following: at least one entire resource element group, or at least one entire control channel element. The UE may receive the DMRS based on the configuration of the specific resource range. In this way, the channel estimation accuracy can be improved in a case of a weak PDCCH coverage. Meanwhile, the total overhead for PDCCH and corresponding DMRS can be flexible and reduced compared with increasing the aggregation level or PDDCH repetition.

Principle and implementations of the present disclosure will be described in detail as below with reference to FIG. 2, which shows a schematic process of dedicated resource configuration for transmission of DMRS. For the purpose of discussion, the process 200 will be described with reference to FIG. 1. The process 200 may involve the UE 110 and the gNB 120 as illustrated in FIG. 1.

Figure 2:
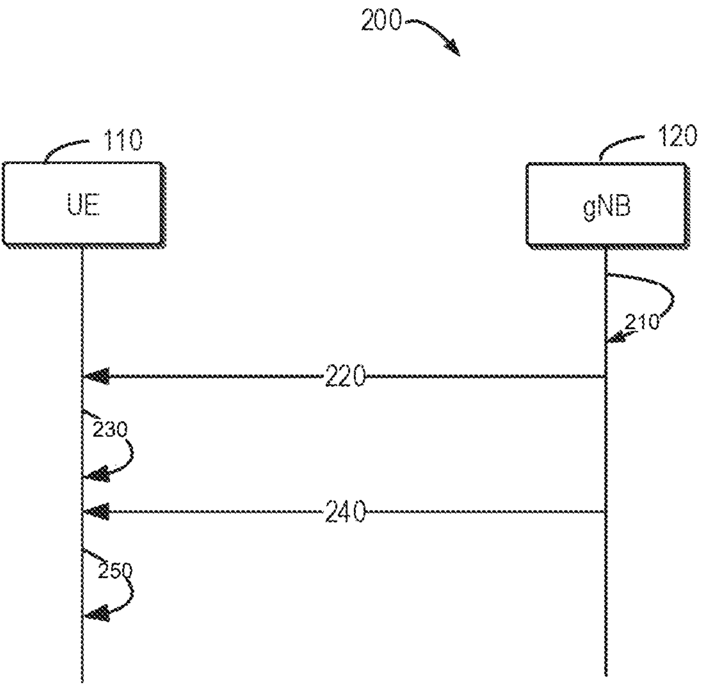
FIG. 2 shows a signaling chart illustrating a process of dedicated resource configuration for transmission of DMRS according to some example embodiments of the present disclosure.

As shown in FIG. 2, for transmitting the DMRS, the gNB 120 may generate 210 an indication of a resource range related to the transmission of the DMRS associated with a reception of PDCCH between the gNB 120 and the UE 110.

The resource range may comprise an entire REG, an entire CCE, a REG bundle or a CCE bundle specific for DMRS transmission. All REs included in the resource range are only allowed to be dedicated for the transmission of the DMRS and unavailable for a transmission of control information via the PDCCH.

In some example embodiments, the resource range can be configured to be located in different manner. For example, the resource range can be configured to be located in the PDCCH region but outside of a set of CCEs associated with the PDCCH aggregation level. Alternatively, the resource range can also be configured to be located out of a set of CCEs associated with the PDCCH aggregation level.

In some example embodiments, the at least one REG or the at least one CCE in the resource range can be configured to be located in a localized manner or in a distributed manner in system bandwidth or bandwidth part. The DMRS RE mapping on DM-RS specific CCE could be different from the DMRS on PDCCH CCEs.

Figure 3A:
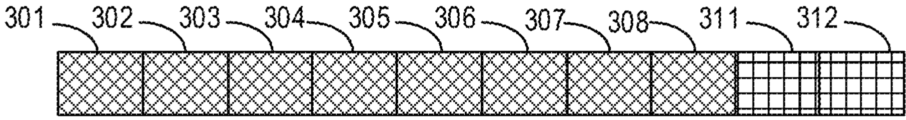
FIGS. 3A-3C show examples of resource range configured for the DMRS transmission according to some example embodiments of the present disclosure.
Figure 3B:
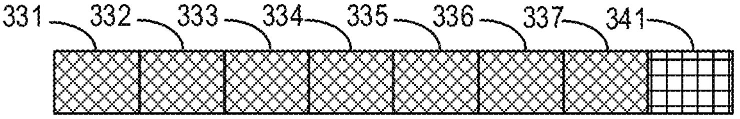
Figure 3C:
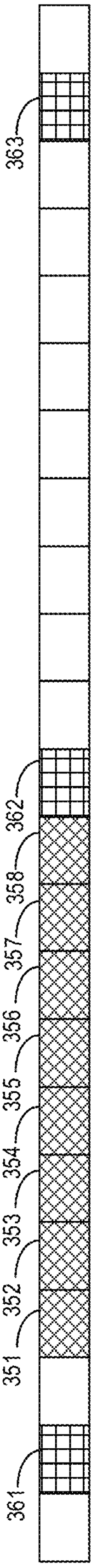
Figure 3C:

FIGS. 3A-3C show examples of resource range configured for the DMRS transmission according to some example embodiments of the present disclosure.

As shown in FIG. 3A, if PDCCH is with aggregation level 8, CCEs 301-308 are mapped as legacy PDCCH and DMRS mapping and additional DMRS specific CCEs 311 and 312 are configured to be dedicated for the transmission of DMRS and not allowed to be used to map PDCCH.

In some example embodiments, how many DMRS specific REG(s)/CCE(s) could be configurable depends on the requirement of the additional DMRS to increase the density of the DMRS. For example, for an 8 CCE PDCCH, as a conventional way, there are 8*6 REGs. As there are 3 REs used for PDCCH DMRS, so totally there are 8*6*3=144 REs for PDCCH DMRS and the 8*6*9=432 REs for PDCCH. That is, the number of RE for PDCCH DMRS/total RE for PDCCH+DMRS=144/(432+144)=25%.

In a case where 2 DMRS specific CCEs are introduced, as shown in FIG. 3A, the number of RE for PDCCH DMRS/number of RE for PDCCH+DMRS may be changed to be (144+144)/(432+144+144)=40%. It can be seen that the percentage of PDCCH DMRS will be increased by 60%, as from 25% to 40%.

Furthermore, in a case where 1 DMRS specific CCE is introduced, the percentage of PDCCH DMRS will be increased by 33.33%, while in a case where 3 DMRS specific CCEs are introduced, the percentage of PDCCH DMRS will be increased by 17.64%.

In a case where 1 DMRS specific REG is introduced, the percentage of PDCCH DMRS will be increased by 6.12%.

As shown in FIG. 3B, if PDCCH is with aggregation level 8, the first seven CCEs, namely CCEs 331-337 are mapped as legacy PDCCH and DMRS mapping and a DMRS specific CCE 341 is configured to be dedicated for the transmission of DMRS and not allowed to be used to map PDCCH. For PDCCH with large aggregation level, adjusting the ratio of DMRS RE/PDCCH RE by configuring the DMRS specific CCE within the PDCCH aggregation level may improve PDCCH channel estimation without impacting the other UEs.

Figures 8, 9:
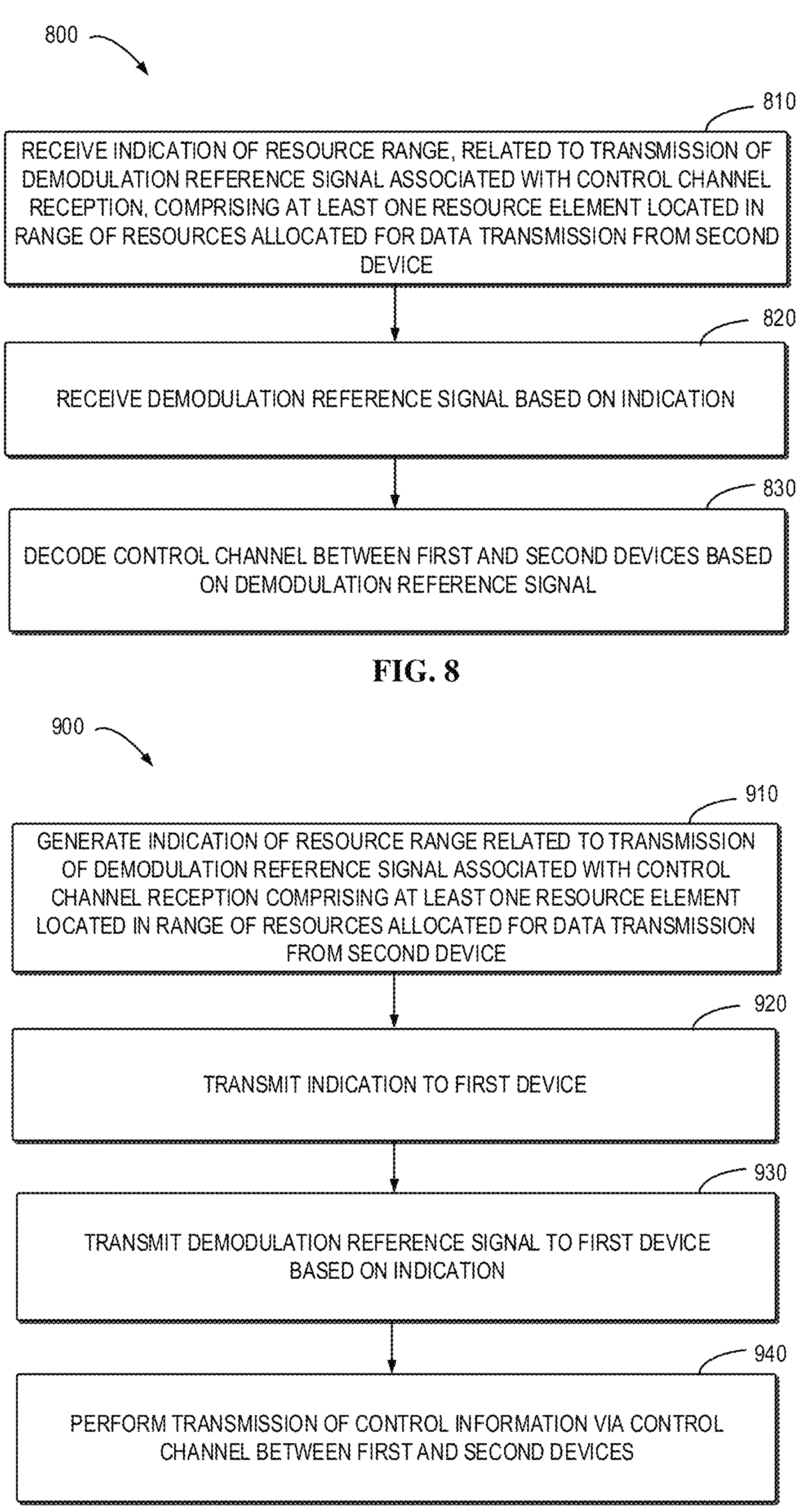
FIG. 8 shows a flowchart of an example method of dedicated resource configuration for transmission of DMRS according to some example embodiments of the present disclosure.
FIG. 9 shows a flowchart of an example method of dedicated resource configuration for transmission of DMRS according to some example embodiments of the present disclosure.

As shown in FIG. 3C, the at least one REG or the at least one CCE can be localized or distributed in a bandwidth. As shown in FIG. 3C, 8 CCEs 351-358 are configured for PDCCH, while 3 DMRS specific CCEs 361-363 can be distributed in a bandwidth. As shown in FIG. 3A, the 2 DMRS specific CCEs 311 and 312 can be localized.

Figure 4A:
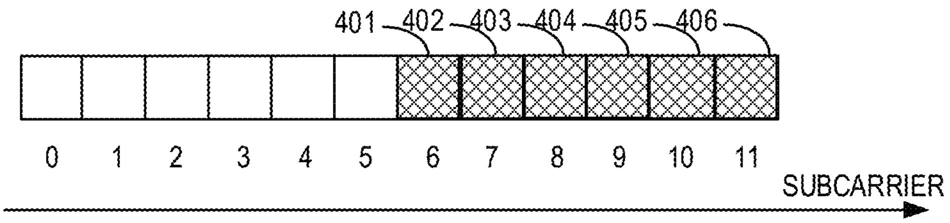
FIGS. 4A-4B show examples of resource elements in one REG configured for multiple PDCCHs according to some example embodiments of the present disclosure.
Figure 4B:
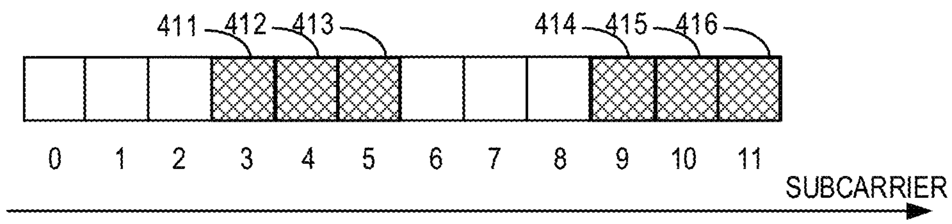

In some example embodiments, the REs included in the DMRS specific REG(s)/CCE(s) can be configured for one or multiple PDCCHs. For example, the REs included in the DMRS specific REG(s)/CCE(s) can be divided into multiple sets of REs and each set is used for one UE PDCCH DMRS or unoccupied. FIGS. 4A-4B show examples of resource elements in one REG configured for multiple PDCCHs according to some example embodiments of the present disclosure.

As shown in FIG. 4A, in one DMRS specific REG, REs 401-406 can be configured for a DMRS transmission associated with the reception of the PDCCH between the UE 110 and the gNB 120. Other REs in the DMRS specific REG can be configured for a DMRS transmission associated with the reception of the other PDCCH(s).

The REs for multiple PDDCHs can be mapped in different manners. For example, as shown in FIG. 4B, in one DMRS specific REG, REs 411-413 and 414-416 can be configured for a DMRS transmission associated with the reception of the PDCCH between the UE 110 and the gNB 120. Other REs in the DMRS specific REG can be configured for a DMRS transmission associated with the reception of the other PDCCH(s).

In some example embodiments, the resource range configured related to the transmission of the DMRS associated with a reception of PDCCH can be located out of the CORESET associated with the PDCCH between the UE 110 and gNB 120. For example, the resource range can be located in another CORESET.

In some example embodiments, as another option, the resource range may also comprise at least one RE and the at least one RE may be configured to be located in a range of resources allocated for a data transmission from the gNB 120 via a Physical Downlink Shared Channel (PDSCH). Similarly, the at least one REs included in the resource range are only allowed to be dedicated for the transmission of the DMRS and unavailable for the data transmission.

In some example embodiments, the at least one REs can be distributed in PDSCH area, which could be very flexible and totally no impact to other UE PDCCH, where the RE or PRB used for PDCCH DMRS could be configured to UE as occupied and not used for PDSCH transmission, within same slot of PDCCH or other slot than the slot for the PDCCH.

For example, the DMRS specific REG in PDSCH area could be located in at least one pattern of CSI-RS, distributed PRBs or localized in consecutive PRBs. These REs could be configured as ZP-CSI-RS and not used for PDSCH transmission. Alternatively, the DMRS specific REG in PDSCH area could be located in other patterns, distributed PRBs or localized in consecutive PRBs. These PRBs or REs could be configured not used for PDSCH transmission.

Figure 5A:
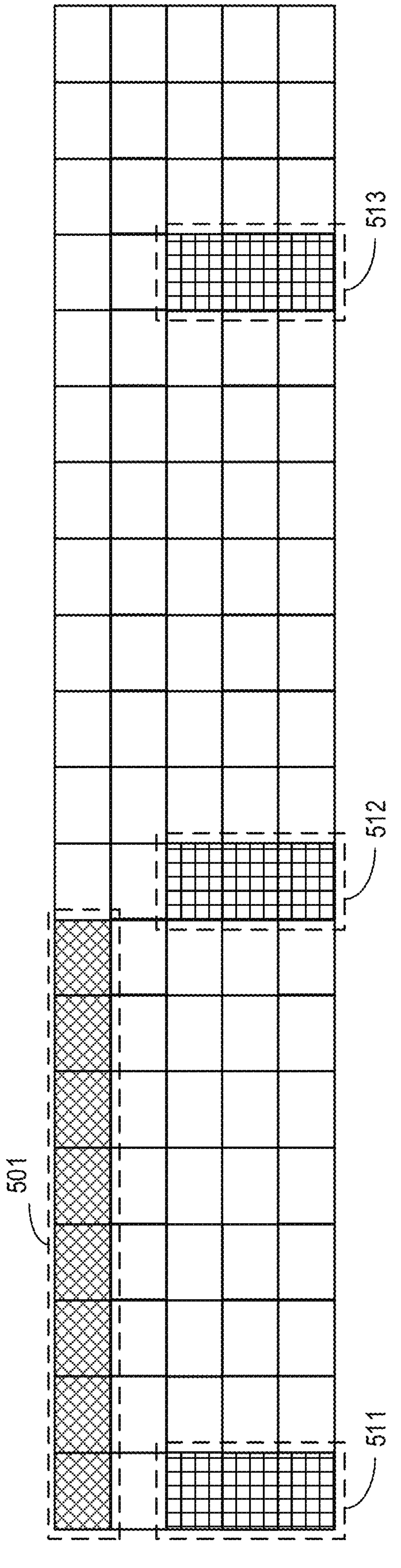
FIGS. 5A-5B show examples of resource range configured for the DMRS transmission according to some example embodiments of the present disclosure.
Figure 5B:
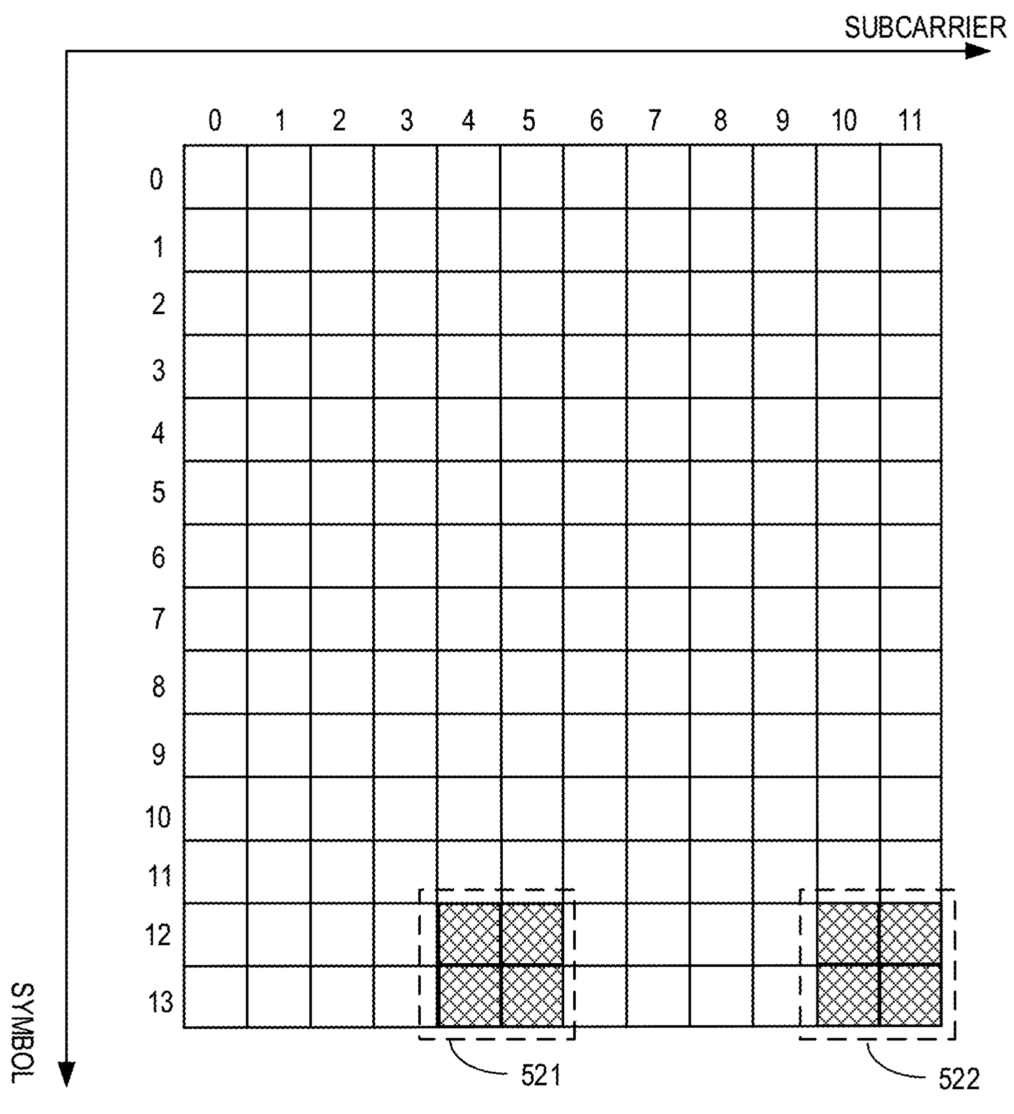

FIGS. 5A-5B show examples of resource range configured for the DMRS transmission according to some example embodiments of the present disclosure.

As shown in FIG. 5A, the DMRS specific REs can be located in, for example, the regions 511, 512 and 513 out of the CORESET 501 associated with the PDCCH. As shown in FIG. 5B, the DMRS specific REGs, for example, REGs 521 and 522, in PDSCH area could be located in a pattern of CSI-RS. This CSI-RS could be configured as not be used for PDSCH transmission, e.g. configured as zero-power CSI-RS to UEs and not used for PDSCH. As one additional example, new pattern could also be defined for DMRS specific REs and defined them as not used by PDSCH.

Referring back to FIG. 2, after generating the indication of the resource range related to a transmission of a demodulation reference signal associated with a control channel reception, the gNB 120 may transmit 220 the indication to the UE 110.

In some example embodiments, the gNB 120 may transmit the indication via a radio resource control (RRC) signaling. Alternatively, the gNB 120 may transmit the indication via configuration information associated with PDCCH.

Based on the indication, the UE 110 may determine 230 the resources dedicated for the transmission of DMRS. For example, the UE 110 may determine that all REs in the resource range indicated in the indication can be used for receiving the DMRS associated with the PDCCH reception.

In some example embodiments, as mentioned above, the DMRS specific REG(s)/CCE(s) included in the resource range may also be configured for multiple UEs. For example, the UE 110 may determine a set of REs from the DMRS specific REG(s)/CCE(s) based on the indication and the identifier of the UE 110 for receiving the DMRS associated with the PDCCH reception between the UE 110 and the gNB 120.

In some example embodiments, the UE 110 may determine a set of REGs or a set of CCEs from the DMRS specific CCE(s) based on the indication for receiving the DMRS associated with the PDCCH reception between the UE 110 and the gNB 120. For example, the set of REGs for receiving the DMRS associated with the PDCCH reception may be determined from each of DMRS specific CCE(s) or partial DMRS specific CCE(s).

As shown in FIG. 2, the gNB 120 may transmit 240 the DMRS to the UE 110. The UE 110 may receive the DMRS on the resources determined based on the indication. Based on the received DMRS, the UE 110 may decode 250 the PDCCH between the UE 110 and gNB 120. Alternatively, the UE 110 may also demodulate the PDCCH between the UE 110 and gNB 120 based on the received DMRS or perform a channel estimation based on the received DMRS.

In some example embodiments, the DMRS dedicate REG (s)/CCE(s) could be separately configured for at least one of unicast and non-unicast PDCCH.

In some example embodiments, the DMRS dedicate REG (s)/CCE(s) can be configured to be used only for certain candidates in the search spaces. For example, UE may be configured to use additional DMRS only for large aggregation level; (AL=8 or 16), or for candidates with certain number of repetition, or candidates with certain combination of aggregation level and repetition (e.g. AL=8 and Repetition=2). For other candidates, there is no additional DMRS.

In this way, the channel estimation accuracy can be improved in a case of a weak PDCCH coverage. Meanwhile, the total overhead for PDCCH and corresponding DMRS can be flexible and reduced compared with increasing the aggregation level or PDDCH repetition.

Figures 6, 7:
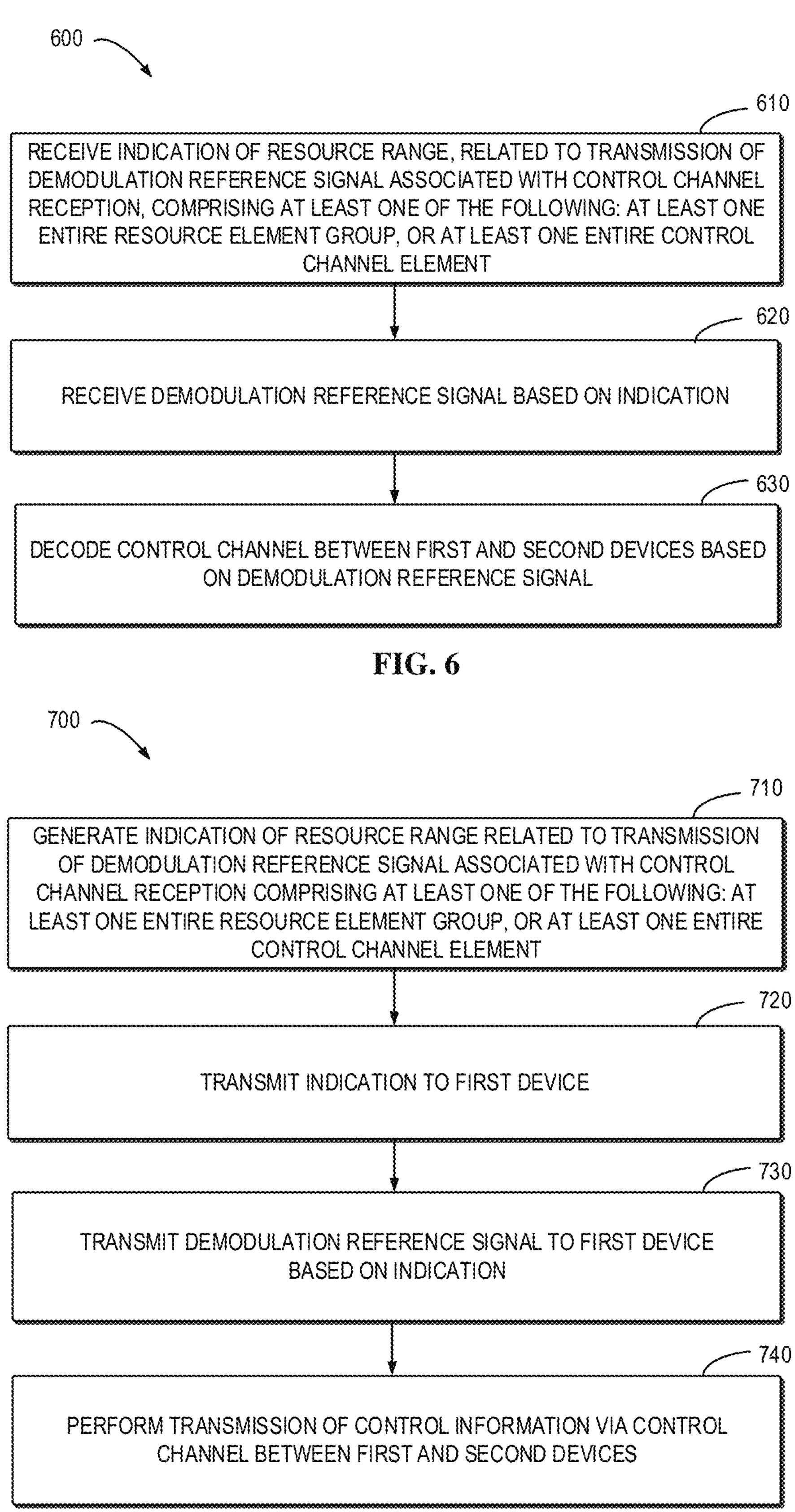
FIG. 6 shows a flowchart of an example method of dedicated resource configuration for transmission of DMRS according to some example embodiments of the present disclosure.
FIG. 7 shows a flowchart of an example method of dedicated resource configuration for transmission of DMRS according to some example embodiments of the present disclosure.

FIG. 6 shows a flowchart of an example method 600 of dedicated resource configuration for transmission of DMRS according to some example embodiments of the present disclosure. The method 600 can be implemented at the first device 110 as shown in FIG. 1. For the purpose of discussion, the method 600 will be described with reference to FIG. 1.

At 610, the first device receives, from a second device, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device.

In some example embodiments, the resource range is configured to be located in at least one of the following manners: within a range of a set of control channel elements associated with an aggregation level of the control channel; out of the range of the set of control channel elements associated with the aggregation level of the control channel; within a control resource set configured for the control channel; and out of the control resource set configured for the control channel.

In some example embodiments, the first device may receive the indication from a radio resource control signaling.

In some example embodiments, the first device may receive the indication from configuration information associated with the control channel.

At 620, the first device receives the demodulation reference signal based on the indication.

In some example embodiments, the first device may determine a target set of resource elements from the resource elements based on the indication and an identifier of the first device and receive the demodulation reference signal based on the target set of resource elements.

In some example embodiments, the resource allocation pattern indicates at least one control channel element, the first device may determine, based on the indication and from the at least one control channel element, target resources for receiving demodulation reference signal comprising at least one of the following: a target set of resource element groups; and a target set of control channel elements; and receive the demodulation reference signal based on the target resources.

In some example embodiments, the first device may receive the demodulation reference signal in accordance with a determination that at least one of the following: an aggregation level configured the control channel exceeds a threshold level; or a repetition number configured for the control channel exceeds a threshold number.

At 630, the first device decodes a control channel between the first and second devices based on the demodulation reference signal.

In some example embodiments, the first device may decode at least one of the following: the control channel in a unicast manner, or the control channel in a non-unicast manner.

FIG. 7 shows a flowchart of an example method 700 of dedicated resource configuration for transmission of DMRS according to some example embodiments of the present disclosure. The method 700 can be implemented at the second device 120 as shown in FIG. 1. For the purpose of discussion, the method 700 will be described with reference to FIG. 1.

At 710, the second device generates an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device.

In some example embodiments, the resource range is configured to be located in at least one of the following manners: within a range of a set of control channel elements associated with an aggregation level of the control channel; out of the range of the set of control channel elements associated with the aggregation level of the control channel; within a control resource set configured for the control channel; and out of the control resource set configured for the control channel.

At 720, the second device transmits the indication to a first device.

In some example embodiments, the second device may transmit the indication via a radio resource control signaling.

In some example embodiments, the second device may transmit the indication via configuration information associated with the control channel.

At 730, the second device transmits the demodulation reference signal to the first device via configuration information associated with the control channel.

at 740, the second device performs the transmission of the control information via a control channel between the first and second devices.

In some example embodiments, the second device may perform the transmission of the control information via at least one of the following: the control channel in a unicast manner, or the control channel in a non-unicast manner.

FIG. 8 shows a flowchart of an example method 800 of dedicated resource configuration for transmission of DMRS according to some example embodiments of the present disclosure. The method 800 can be implemented at the first device 110 as shown in FIG. 1. For the purpose of discussion, the method 800 will be described with reference to FIG. 1.

At 810, the first device receives from a second device, an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission.

In some example embodiments, the resource range is configured based on at least one resource pattern of a channel state information reference signal associated with the data transmission.

In some example embodiments, the first device may receive the indication from a radio resource control signaling.

In some example embodiments, the first device may receive the indication from configuration information associated with the control channel.

At 820, the first device receives the demodulation reference signal based on the indication.

In some example embodiments, the first device may receive the demodulation reference signal in accordance with a determination that at least one of the following: an aggregation level configured the control channel exceeds a threshold level; or a repetition number configured for the control channel exceeds a threshold number.

At 830, the first device decodes a control channel between the first and second devices based on the demodulation reference signal.

In some example embodiments, the first device may decode at least one of the following: the control channel in a unicast manner, or the control channel in a non-unicast manner.

FIG. 9 shows a flowchart of an example method 900 of dedicated resource configuration for transmission of DMRS according to some example embodiments of the present disclosure. The method 900 can be implemented at the second device 120 as shown in FIG. 1. For the purpose of discussion, the method 900 will be described with reference to FIG. 1.

At 910, the second device generates an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission.

In some example embodiments, the resource range is configured based on at least one resource pattern of a channel state information reference signal associated with the data transmission.

At 920, the second device transmits the indication to a first device.

In some example embodiments, the second device may transmit the indication via a radio resource control signaling.

In some example embodiments, the second device may transmit the indication via configuration information associated with the control channel.

At 930, the second device transmits the demodulation reference signal to the first device via configuration information associated with the control channel.

at 940, the second device performs the transmission of the control information via a control channel between the first and second devices.

In some example embodiments, the second device may perform the transmission of the control information via at least one of the following: the control channel in a unicast manner, or the control channel in a non-unicast manner.

In some example embodiments, an apparatus capable of performing the method 600 (for example, implemented at the first device 110) may comprise means for performing the respective steps of the method 600. The means may be implemented in any suitable form. For example, the means may be implemented in a circuitry or software module.

In some example embodiments, the apparatus comprises means for receiving, from a second device, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device;

means for receiving the demodulation reference signal based on the indication; and means for decoding a control channel between the first and second devices based on the demodulation reference signal.

In some example embodiments, an apparatus capable of performing the method 700 (for example, implemented at the second device 120) may comprise means for performing the respective steps of the method 700. The means may be implemented in any suitable form. For example, the means may be implemented in a circuitry or software module.

In some example embodiments, the apparatus comprises means for generating, an indication of a resource range, related to a transmission of a demodulation reference signal associated with a control channel reception, comprising at least one of the following: at least one entire resource element group, or at least one entire control channel element; and wherein the resource elements located in the resource range are dedicated for the transmission of the demodulation reference signal and unavailable for a transmission of control information from the second device; means for transmitting the indication to a first device; means for transmitting the demodulation reference signal to the first device based on the indication; and means for performing the transmission of the control information via a control channel between the first and second devices.

In some example embodiments, an apparatus capable of performing the method 800 (for example, implemented at the first device 110) may comprise means for performing the respective steps of the method 800. The means may be implemented in any suitable form. For example, the means may be implemented in a circuitry or software module.

In some example embodiments, the apparatus comprises means for receiving, from a second device, an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; means for receiving the demodulation reference signal based on the indication; and means for decoding a control channel between the first and second devices based on the demodulation reference signal.

In some example embodiments, an apparatus capable of performing the method 900 (for example, implemented at the second device 120) may comprise means for performing the respective steps of the method 900. The means may be implemented in any suitable form. For example, the means may be implemented in a circuitry or software module.

In some example embodiments, the apparatus comprises means for generating an indication of a resource range, related to a transmission of a demodulation reference signal associated with a control channel reception, comprising at least one resource element located in a range of resources allocated for a data transmission from the second device, wherein the at least one resource element is dedicated for the transmission of the demodulation reference signal and unavailable for the data transmission; means for transmitting the indication to a first device; means for transmitting the demodulation reference signal to the first device based on the indication; and means for performing the transmission of the control information via a control channel between the first and second devices.

Figure 10:
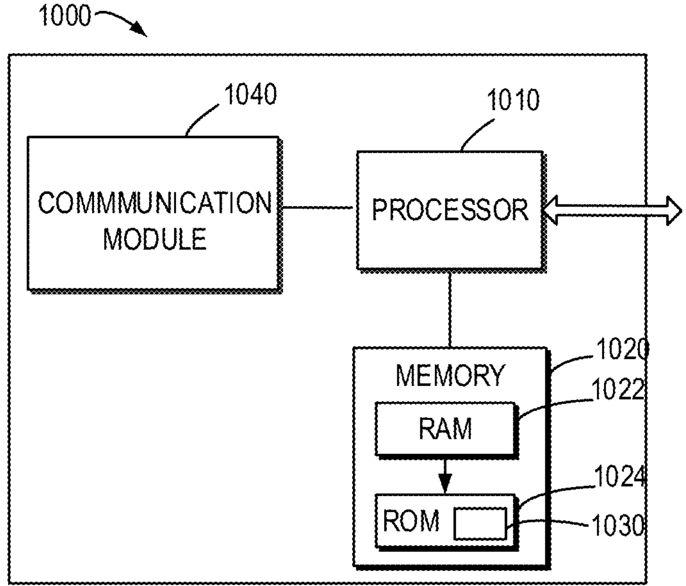
FIG. 10 shows a simplified block diagram of a device that is suitable for implementing example embodiments of the present disclosure.

FIG. 10 is a simplified block diagram of a device 1000 that is suitable for implementing embodiments of the present disclosure. The device 1000 may be provided to implement the communication device, for example the UE 110 or the gNB 120 as shown in FIG. 1. As shown, the device 1000 includes one or more processors 1010, one or more memories 1020 coupled to the processor 1010, and one or more transmitters and receivers (TX/RX) 1040 coupled to the processor 1010.

The TX/RX 1040 is for bidirectional communications. The TX/RX 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1020. The processor 1010 may perform any suitable actions and processing by loading the program 1030 into the RAM 1020.

The embodiments of the present disclosure may be implemented by means of the program 1030 so that the device 1000 may perform any process of the disclosure as discussed with reference to FIGS. 2-9. The embodiments of the present disclosure may also be implemented by hardware or by a combination of software and hardware.

Figure 11:
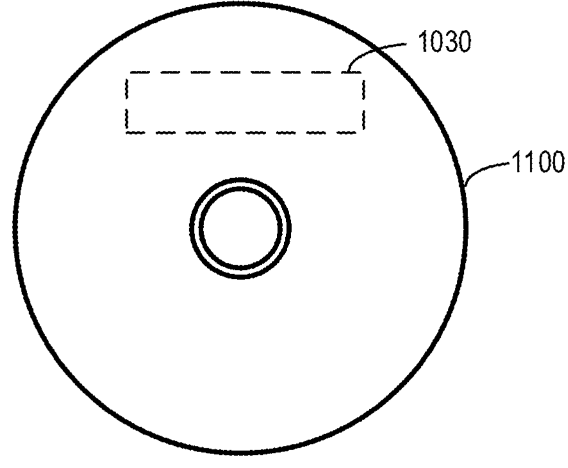
FIG. 11 shows a block diagram of an example computer readable medium in accordance with some embodiments of the present disclosure.

In some embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 600-900 as described above with reference to FIGS. 6-9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:

at least one processor; and at least one memory including computer program codes;

the at least one memory and the computer program codes are configured to, with the at least one processor, cause the terminal device at least to receive, from a network device via a radio resource control (RRC) signaling, an indication of a resource range, related to a transmission of a demodulation reference signal associated with a control channel, the resource range comprising:

at least one entire resource element group, at least one entire control channel element, and a plurality of resource elements that are dedicated for the transmission of the demodulation reference signal and unavailable for a transmission of control information from the network device, wherein the resource range is located:

outside of a control resource set (CORESET) configured for the control channel, within resources allocated for a Physical Downlink Shared Channel (PDSCH) transmission, and in a resource pattern of a Channel State Information Reference Signal (CSI-RS), and wherein a mapping of demodulation reference signal resource elements in the resource range is different from a mapping of demodulation reference signal resource elements in control channel elements used for the transmission of control information;

determine that the following conditions associated with the control channel are met:

an aggregation level configured for the control channel exceeds a first threshold level, a repetition number configured for the control channel exceeds a second threshold number, and a combination of the aggregation level and the repetition number meets a predefined criterion;

in response to the determination the conditions associated with the control channel are met, receive the demodulation reference signal-based on the indication by performing operations comprising:

determining a target set of resource elements from the plurality of resource elements within the resource range based on the indication and an identifier of the terminal device; and receiving the demodulation reference signal based on the target set of resource elements; and decode the control channel, between the terminal device and the network device, based on the demodulation reference signal.

2. The terminal device of claim 1, wherein determining the target set of resource elements comprises:

determining, based on the indication and from the at least one control channel element indicated by the indication, target resources comprise the following:

a target set of resource element groups; and
a target set of control channel elements; and
receiving the demodulation reference signal based on the target resources.

3. The terminal device of claim 2, wherein the terminal device decodes the following:
the control channel in a unicast manner, and
the control channel in a non-unicast manner.

4. A network device comprising:
at least one processor; and
at least one memory including computer program codes;
the at least one memory and the computer program codes are configured to, with the at least one processor, cause the network device at least to:
generate an indication of a resource range, related to a transmission of a demodulation reference signal associated with a control channel, the resource range comprising the following:
at least one entire resource element group,
at least one entire control channel element, and
a plurality of resource elements that are dedicated for the transmission of the demodulation reference signal and unavailable for a transmission of control information from the network device,
wherein the resource range is located:
outside of a control resource set (CORESET) configured for the control channel,
within resources allocated for a Physical Downlink Shared Channel (PDSCH) transmission, and
in a resource pattern of a Channel State Information Reference Signal (CSI-RS), and
wherein a mapping of demodulation reference signal resource elements in the resource range is different from a mapping of demodulation reference signal resource elements in control channel elements used for the transmission of control information;
transmit the indication, via a radio resource control (RRC) signaling, to a terminal device;
determine that the following conditions associated with the control channel are met:
an aggregation level configured for the control channel for the terminal device exceeds a first threshold level,
a repetition number configured for the control channel for the terminal device exceeds a second threshold number, and
a combination of the aggregation level and the repetition number meets a predefined criterion;
in response to the determination that the conditions associated with the control channel are met, transmit the demodulation reference signal to the terminal device on a target set of resource elements of the plurality of resource elements within the resource range, wherein the target set of resource elements is based on the indication and an identifier of the terminal device; and
perform the transmission of the control information via the control channel between the terminal device and the network device.

5. The network device of claim 4, wherein the network device is caused to perform the transmission of the control information via the following:
the control channel in a unicast manner, and
the control channel in a non-unicast manner.

6. The network device of claim 5, wherein the resource pattern of the CSI-RS comprises a zero-power CSI-RS pattern, and wherein the plurality of resource elements within the resource range are configured as unavailable for PDSCH transmission to all terminal devices.

7. The network device of claim 6, wherein the plurality of resource elements within the resource range are partitioned into multiple subsets, each subset being associated with a different terminal device identifier, and wherein the target set of resource elements corresponds to a subset associated with the identifier of the terminal device.

8. The network device of claim 7, wherein the resource range comprises at least one entire control channel element located outside a set of control channel elements corresponding to an aggregation level of the control channel.

9. The network device of claim 8, wherein the resource range is configured such that the at least one entire resource element group or the at least one entire control channel element is distributed across non-contiguous physical resource blocks within a bandwidth part.

10. The network device of claim 9, wherein the demodulation reference signal transmitted on the resource range is restricted to control channel candidates in a search space satisfying the following: an aggregation level equal to or exceeding a predefined value; and a repetition number equal to or exceeding a predefined value.

11. The network device of claim 10, wherein the resource range is separately configured for unicast control channel transmissions and non-unicast control channel transmissions, such that the demodulation reference signal transmitted on the resource range is selectively enabled based on a transmission type.

* * * * *